United States Patent
Diab et al.

(10) Patent No.: US 8,310,949 B2
(45) Date of Patent: Nov. 13, 2012

(54) SYSTEM AND METHOD FOR ENHANCED PHYSICAL LAYER DEVICE AUTONEGOTIATION

(75) Inventors: Wael William Diab, San Francisco, CA (US); Scott Powell, Alisa Viejo, CA (US); Yong Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 299 days.

(21) Appl. No.: 12/569,440

(22) Filed: Sep. 29, 2009

(65) Prior Publication Data

US 2011/0007739 A1    Jan. 13, 2011

Related U.S. Application Data

(60) Provisional application No. 61/223,809, filed on Jul. 8, 2009.

(51) Int. Cl.
*G01R 31/08* (2006.01)

(52) U.S. Cl. ........................................ 370/252
(58) Field of Classification Search ............... None
See application file for complete search history.

(56) References Cited

U.S. PATENT DOCUMENTS

| | | | |
|---|---|---|---|
| 5,689,527 A * | 11/1997 | Hawkins et al. | 375/222 |
| 6,349,331 B1 * | 2/2002 | Andra et al. | 709/220 |
| 6,457,055 B1 * | 9/2002 | Hwong et al. | 709/227 |
| 7,127,521 B2 * | 10/2006 | Hsu et al. | 709/233 |
| 7,869,438 B2 * | 1/2011 | Batta | 370/395.5 |
| 2011/0007739 A1 * | 1/2011 | Diab et al. | 370/389 |
| 2011/0085454 A1 * | 4/2011 | Diab et al. | 370/252 |

\* cited by examiner

*Primary Examiner* — Robert Wilson
(74) *Attorney, Agent, or Firm* — Duane S. Kobayashi (57) ABSTRACT

A system and method for enhanced physical layer device autonegotiation. The autonegotiation process typically identifies the highest common denominator amongst various standardized modes of operation. Enhanced autonegotiation can be used to select a mode of operation that is not the highest common denominator. Enhanced autonegotiation can also identify a non-standardized mode of operation using next page messaging, additional physical signaling, or Layer 2 messaging.

17 Claims, 6 Drawing Sheets

| 0-10 | 11 | 12 | 13 | 14 | 15 |
|---|---|---|---|---|---|
| Data Bits | Toggle | Ack2 | Message Page | Ack | Next Page |

SYSTEM AND METHOD FOR ENHANCED PHYSICAL LAYER DEVICE AUTONEGOTIATION

This application claims priority to provisional application No. 61/223,809, filed Jul. 8, 2009, which is incorporated by reference herein, in its entirety, for all purposes.

BACKGROUND

1. Field of the Invention

The present invention relates generally to Ethernet systems and, more particularly, to a system and method for enhanced physical layer device autonegotiation.

2. Introduction

Ethernet devices continue to evolve in capability, including different transmission rates (e.g., 10 Mbit/s, 100 Mbit/s, 1 Gbit/s, 10 Gbit/s, etc.), different standards for those transmission rates (e.g., 100BASE-T2, 100BASE-T4, and 100BASE-TX for 100 Mbit/s over copper), and different duplex modes (i.e., half duplex and full duplex) within a standard. Ethernet devices can be designed to function with different sets of capabilities. Accordingly, a pair of Ethernet devices must communicate with a common set of capabilities to ensure interoperability.

In one configuration scenario, network administrators can manually set the speed and duplex mode of each network interface card. While this process can be effective in identifying the particular transmission capabilities used by all Ethernet devices in a plant, it is time consuming and prone to errors. Efficiency can be gained through the use of an autonegotiation process between a pair of Ethernet devices. This autonegotiation process has the potential to remove manual installation errors. However, autonegotiation is designed to identify a common set of transmission parameters for a single link, not a common set of transmission parameters for all Ethernet devices in a plant. Moreover, an autonegotiation process is typically defined only for a particular set of standardized transmission parameters. For example, the autonegotiation process is not designed to allow for negotiation between non-standard link rates. What is needed therefore is a mechanism that addresses the deficiencies of current autonegotiation processes in accommodating network configuration efforts and ever-evolving Ethernet transmission technologies.

SUMMARY

A system and/or method for enhanced physical layer device autonegotiation, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts, including twisted pair, backplane, and optical applications. In general, autonegotiation can be used by a pair of Ethernet devices in identifying which of a plurality of modes of operation the pair of Ethernet devices will use. Typically, the autonegotiation process identifies the best possible mode of operation (or highest common denominator) that is shared by the two Ethernet devices.

The best possible mode of operation is determined from a list of modes of operation that is designed to reflect a variety of priority rules. For example, the list of rank-ordered modes of operation can prefer a higher speed over a lower speed, and full duplex over half duplex at the same speed. In general, the list of rank-ordered modes of operation is designed to provide the autonegotiation process with a mechanism for identifying the highest common standardized mode of operation for that link.

In the OSI model, autonegotiation resides in the physical layer, which can include a PCS (physical coding sublayer), a PMA (physical medium attachment), and a PMD (physical media dependent). The PCS is generally responsible for encoding/decoding to/from code-groups for communication with the underlying PMA. In general, the PMA abstracts the PCS from the physical medium. Accordingly, the PCS can be unaware of the type of medium. The primary functions of the PMA include mapping of transmit and receive code-groups between the PCS and PMA, serialization/de-serialization of code-groups for transmission/reception on the underlying serial PMD, recovery of clock from the coded data (e.g., 8B/10B, 64B/66B, etc.) supplied by the PMD, and mapping of transmit and receive bits between the PMA and PMD. The PMD is generally responsible for generating electrical or optical signals depending on the nature of the physical medium connected. PMD signals are sent to the medium dependent interface (MDI), which is the actual medium connected, including connectors, for the various media supported.

Figure 1:
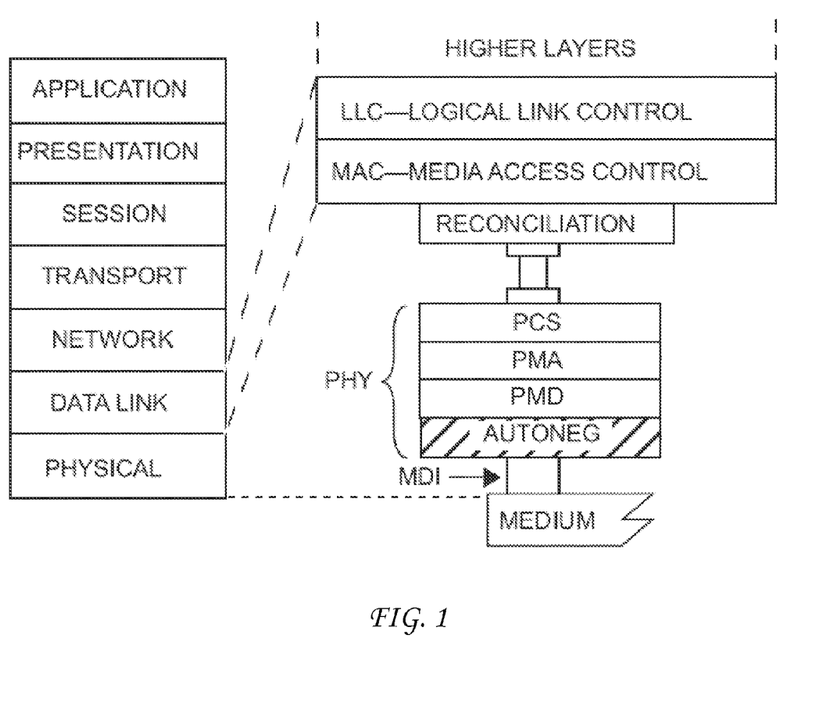
FIG. 1 illustrates an example of Ethernet physical layer devices (PHYs).

In the example of FIG. 1, the autonegotiation is below the PMD. This configuration is exemplified by an implementation such as 100BASE-TX. In another example such as 1000BASE-T, the autonegotiation is included by the Ethernet device as part of the PCS.

The autonegotiation process has been designed to identify the highest common denominator amongst the various standardized modes of operation. These standardized modes of operation represent only a subset of the total available modes of operation, which can also include non-standard modes of operation.

One example of a non-standard mode of operation is a non-standard link rate. Standard link rates such as 10 Mbit/s, 100 Mbit/s, 1 Gbit/s and 10 Gbit/s have been defined. Owing to the order of magnitude increases in the subsequent generations of link rates, the standard link rates may not always represent the most practical link rate for a given application.

For example, consider an uncompressed 1080P high-definition video stream, which would require a transmission link rate of approximately 12 Gbit/s. One option is to accommodate the 12 Gbit/s video stream in a 10 Gbit/s link rate using compression. Another option is to accommodate the 12 Gbit/s video stream in a non-standard 12 Gbit/s link rate. One of the benefits of using a non-standard link rate of 12 Gbit/s would be the reduced power consumption as compared to that required in operating at the next potential standardized link rate of 40 Gbit/s. As would be appreciated, considerations of power, complexity, and cost have rendered non-standard intermediate link rates such as 2.5 Gbit/s, 5 Gbit/s, etc. as potentially practical solutions for a given application.

Another example of a non-standard mode of operation is a mode of operation that accommodates non-standard link distances. Typical Ethernet standards are defined for link distances up to 100 meters for a given type of cabling. Non-standard modes of operation can also be defined for short-reach applications (e.g., link distances up to a maximum distance that is less than 100 meters) or broad-reach applications (e.g., link distances up to a maximum distance that is greater than 100 meters). Each of these non-standard link distances can be accommodated using considerations of the constraints of the particular channel. In one embodiment, reach detection can enhance the autonegotiation process.

A further example of a non-standard mode of operation is asymmetric transmission. In this non-standard mode of operation, a link can operate in a first standard or non-standard link rate in a first direction and in a second standard or non-standard link rate in a second direction. Consider a scenario of a consumer device designed to handle an input HDTV stream at a particular port that interfaces with a DVD player. The input direction can be designed to operate at a non-standard 12 Gbit/s link rate, while the output direction can be designed to operate at a standard 100 Mbit/s link rate. This scenario illustrates the further possibility of combining different standard and non-standard modes of operation onto a particular link.

As would be appreciated, further non-standard modes of operation can also be defined for a particular Ethernet device. Configuring a given link to operate in one of these non-standard modes of operation has typically required a manual process. It is therefore a feature of the present invention that a link can be configured to operate in one of the non-standard modes of operation using an autonegotiation-based process.

As noted above, a conventional autonegotiation process is used to select the highest common denominator from a set of standard modes of operation. This conventional autonegotiation process can be deficient in that the desired mode of operation for a particular link may not equate to the highest common denominator nor one of the standard modes of operation.

Consider for example, the case of an autonegotiation process implemented in a plant or installation with a variety of channels. In this context, the desired mode of operation for a particular link would be impacted by the needs and overall goals of the plant or installation. In other words, the desired mode of operation would not be dictated simply by the capabilities of the Ethernet devices on both ends of the particular link. For example, the overall goal of the plant or installation may focus on power savings, which can dictate that the lowest common denominator rather than the highest common denominator would be desired. Hence, in one scenario, a 1 Gbit/s link would provide extraneous and unneeded performance when used in a network that is dominated by 100 Mbit/s links. This is especially true where the 100 Mbit/s links are more than sufficient to meet the needs of the various users and applications within the plant.

In one embodiment of the present invention, the desired range or particular mode of operation for a link can be specified through a management interface. This management interface can be designed to specify a range or particular mode of operation for various Ethernet devices in the network. As such, management of the mode of operation of a network of Ethernet devices can be located in the network (e.g., distributed).

In one embodiment, a network management protocol such as the Simple Network Management Protocol (SNMP) can be used. Here, the management function within a network management station can be enabled using a user interface, which can control the network management application. The network management application, in turn, can communicate with software agents in various systems over the network.

Regardless of the particular layer at which the management control is effected, a register, programmable read only memory (PROM), etc. that is accessible by the Ethernet device can be programmed with a range or particular mode of operation. This programmed range or particular mode of operation can be used alone or in combination with the autonegotiation process to determine the mode of operation of the Ethernet device.

Figure 2:
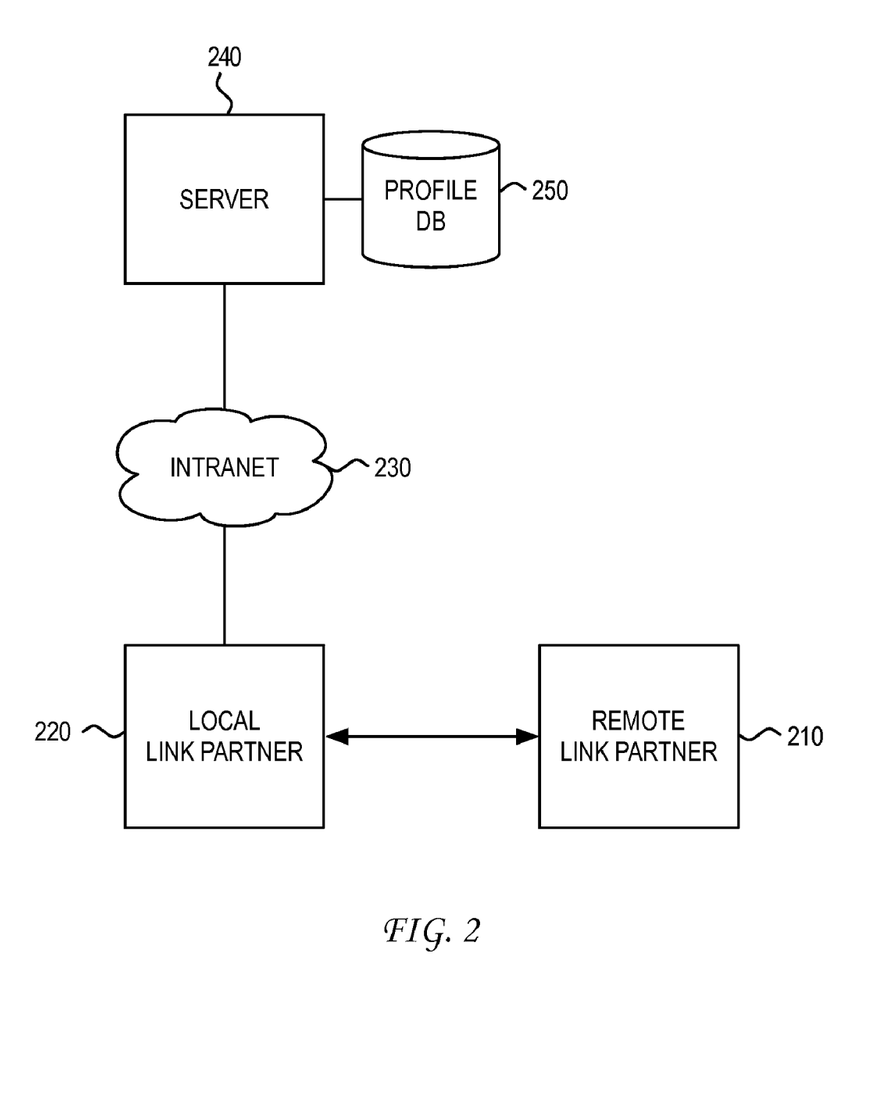
FIG. 2 illustrates an example of retrieving operating mode profile information via a network.

In one embodiment, the desired mode of operation for a particular Ethernet device is stored as part of a network profile for that Ethernet device. FIG. 2 illustrates an example of such a configuration where mode of operation profile information can be retrieved from a network database. As illustrated, local link partner 220 is in communication with remote link partner 210 over a link. In one example, local link partner 220 can represent a switch, which supports a plurality of link partners. As would be appreciated, the link can be part of a LAN, MAN, WAN, wholly managed private network (e.g., VPN), etc.

In the autonegotiation process, local link partner 220 can access profile database 250 via server 240, which is linked to local link partner 220 via intranet 230. As would be appreciated, the contents of profile database 250 need not be centralized, but can be cached or otherwise distributed across different parts of the network.

The access of profile database 250 by local link partner 220 during the autonegotiation process can be based on identifying information (e.g., user, device, etc.) that is associated with itself or remote link partner 210. For example, the access of profile database 250 can be based on a user identifier, MAC address, or any other identifying information. Through the access of profile database 250, the autonegotiation process associated with local link partner 220 can retrieve autonegotiation management information that can be used to determine the common mode of operation between local link partner 220 and remote link partner 210. In various embodiments, access to profile database 250 is facilitated by a Layer 2 or Layer 3 mechanism.

Figure 3:
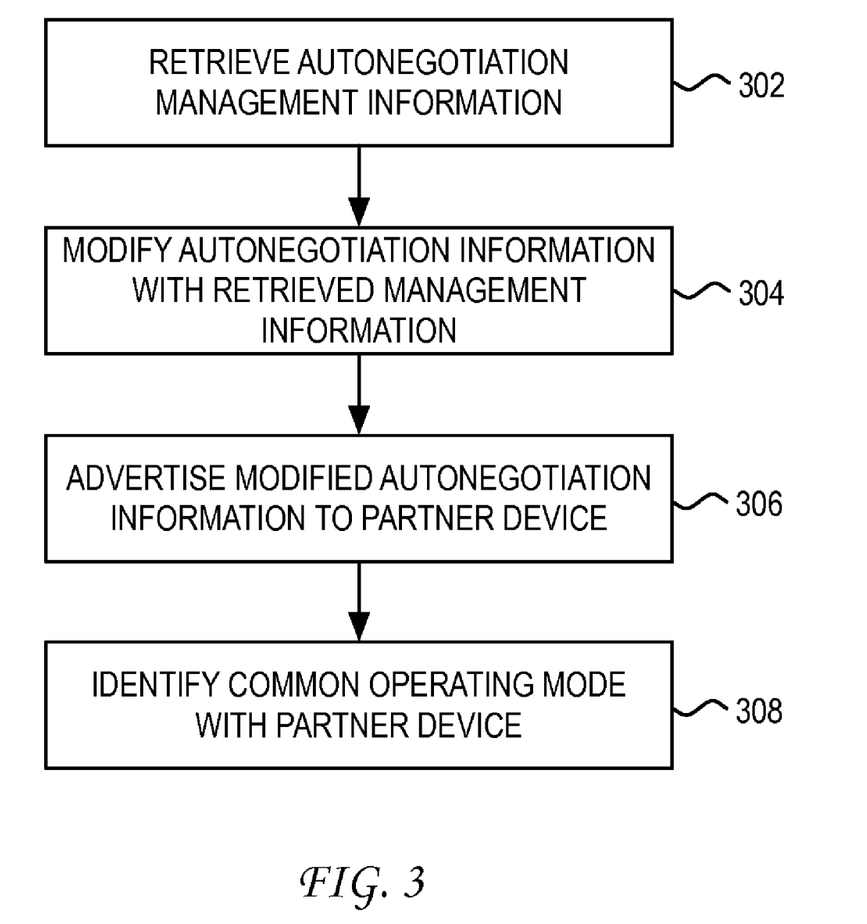
FIG. 3 illustrates a flowchart of an autonegotiation process of the present invention.

To illustrate the usage of management information in the autonegotiation process, reference is now made to the flowchart of FIG. 3. As illustrated, the process of FIG. 3 begins at step 302 where an Ethernet device retrieves management information that specifies a range or particular mode of operation. As noted above, the management information can be retrieved from a register, PROM, network database, or the like.

At step 304, the local link partner then modifies the autonegotiation information with the retrieved management information. In one example, the autonegotiation information can represent the base link code word that specifies the actual capabilities of the Ethernet device. This autonegotiation information can be modified using the management information. For example, the management information can specify a particular mode of operation that represents one of the modes of operation indicated by the original base link code word. The resulting modified autonegotiation information can therefore reflect a modified base link code word that indicates only a single supported mode of operation. In effect, the modified base link code word can advertise a subset of the actual capabilities of the Ethernet device.

At step 306, the modified autonegotiation information is then advertised to the partner Ethernet device. Through this exchange of autonegotiation information, a common mode of operation can then be identified at step 308. It is a feature of the present invention that the management information can be used to direct the autonegotiation process to a result that is not necessarily the highest common denominator.

Where a preferred operating mode is specified, the specified configuration can be used by the autonegotiation process as a ceiling for the mode of operation. The modes of operation that have a link rate greater than the specified maximum link rate would be excluded from the advertised supported modes of operation even though the Ethernet device can support it. This would dictate that a lower-priority configuration would be agreed upon even though other higher-priority configurations would be in common between the Ethernet devices in the link. In another example, a specified range of modes of operation can be used by the autonegotiation process in restricting the available choices of the autonegotiation process to the specified range of modes of operation. In general, the programmed range or particular mode of operation can be used to eliminate choices that would otherwise be available to the autonegotiation process.

As has been described, a specified range or particular mode of operation can be used to limit the autonegotiation process from automatically selecting the highest common denominator. As will be described below, supplemental communication can also be used as part of the autonegotiation process to select a non-standard mode of operation for use between a linked pair of Ethernet devices.

Conventionally, the autonegotiation process is used to select from a set of known, standardized modes of operation. An Ethernet device's capability of supporting these known, standardized modes of operation can be advertised using selected bits in one or more pre-defined autonegotiation message formats. As noted, non-standardized modes of operation are typically selected manually, as those non-standardized modes of operation are not included in the pre-defined autonegotiation message formats.

It is a feature of the present invention that a non-standardized mode of operation can be selected using one or more unformatted next page messages as part of the autonegotiation process. Automated as compared to manual selection of a non-standardized mode of operation between a pair of Ethernet devices is thereby enabled.

Figure 4:
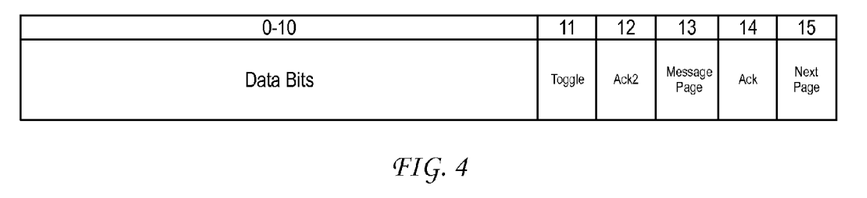
FIG. 4 illustrates an example of an unformatted page used in autonegotiation.

FIG. 4 illustrates a format of an unformatted next page message. In the autonegotiation process, one or more of these unformatted next page messages would be sent in addition to the predefined messages (e.g., base link code word) that are used in the identification of the standard 10/100/1000 modes of operation. By this process, an augmented autonegotiation process would result, wherein the search for a common mode of operation would include the standard modes of operation as well as the additional non-standard modes of operation that are identified using the data in the unformatted next page messages.

Figure 5:
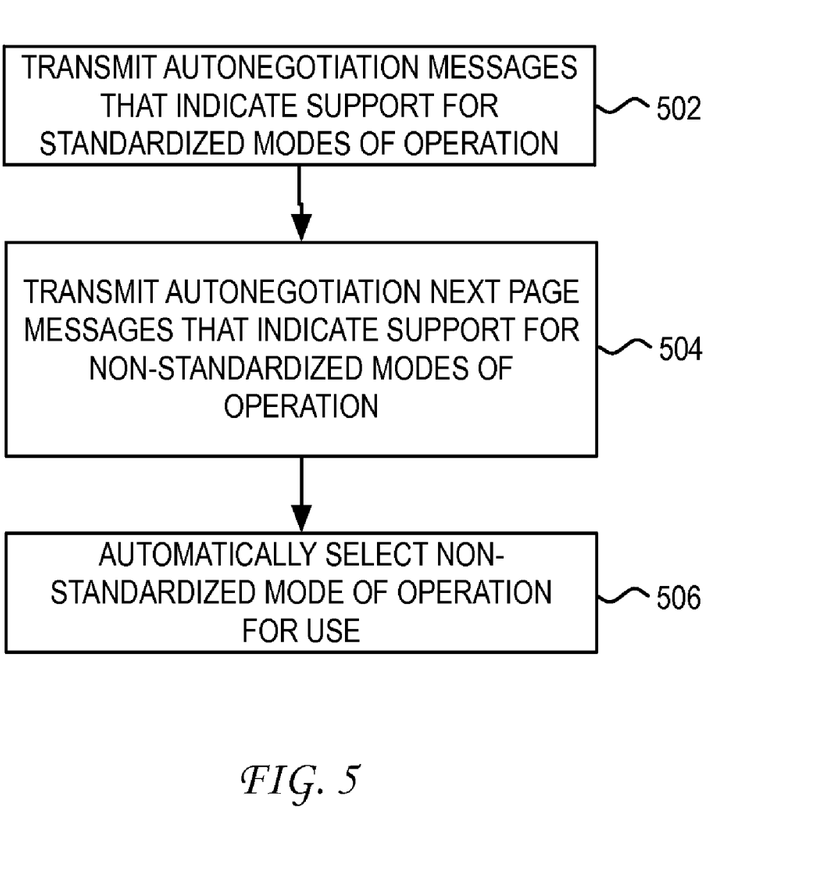
FIG. 5 illustrates a flowchart of an enhanced autonegotiation process using next page messages.

To further illustrate this feature of the present invention, reference is now made to the flowchart of FIG. 5. As illustrated, the process begins at step 502 where an Ethernet device transmits one or more autonegotiation messages that indicates a capability of the Ethernet device to support standardized modes of operation. Standardized modes of operation can include 1000BASE-T full duplex, 1000BASE-T half duplex, 100BASE-T2 full duplex, 100BASE-TX full duplex, 100BASE-T2 half duplex, 100BASE-T4, 100BASE-TX half duplex, 10BASE-T full duplex, 10BASE-T half duplex, etc. For example, 10BASE-T half duplex and 10BASE-T full duplex modes of operation can be indicated by bits 0 and 1, respectively, in the base link code word.

In addition to the transmission of one or more autonegotiation messages that indicates a capability of the Ethernet device to support standardized modes of operation, the Ethernet device also transmits one or more autonegotiation messages that indicates a capability of the Ethernet device to support non-standardized modes of operation. As noted, non-standardized modes of operation can include non-standard link transmission rates (e.g., 12 Gbit/s), short-reach mode of operation, long-reach mode of operation, asymmetric operation, etc. In one example, the indications of the capability to support the non-standardized modes of operation can be provided in bits 0-10 of the next page message of FIG. 4. As would be appreciated, the specific mechanism by which bits 0-10 would be used to indicate support for such non-standardized modes of operation would be implementation dependent. Further, the number of non-standardized modes of operation being advertised can dictate the particular number of next page messages that are needed to advertise such capabilities. In general, the specific number of unformatted next page message used can depend on the type of information that is transmitted.

The transmission of autonegotiation messages that advertise capabilities to support both standardized and non-standardized modes of operation enables a pair of Ethernet devices to automatically identify a common mode of operation from the non-standardized modes of operation in addition to the standardized modes of operation. Upon the exchange of advertised capabilities, the Ethernet device can then select a non-standardized mode of operation for use at step 506.

In another embodiment, a non-standardized mode of operation can be selected using physical signaling in addition to the conventional autonegotiation signaling (e.g., link pulses). While the specific form of physical signaling would be implementation dependent, the physical signaling can be designed to supplement or even replace the conventional autonegotiation signaling by providing information regarding additional non-standardized modes of operation that may be in common between the two Ethernet devices.

In one scenario, a set of physical signals different from the conventional autonegotiation signals is used. For example, the conventional autonegotiation signaling may not go as far as needed (e.g., broad reach applications) or may not be used over older cabling. In accordance with the present invention, the physical signaling can be used alone or in conjunction with existing autonegotiation signals to facilitate selection of an operating mode from a mix of various operating modes.

In yet another embodiment, a non-standard mode of operation can be selected using Layer 2 messaging. Here, the autonegotiation process can be used to identify an initial mode of operation. This initial mode of operation can represent a minimum or base-level of commonality between the two Ethernet devices. After the initial mode of operation is established, the Layer 2 messaging can be used to identify a common standardized or non-standardized mode of operation that can be used on the link.

Figure 6:
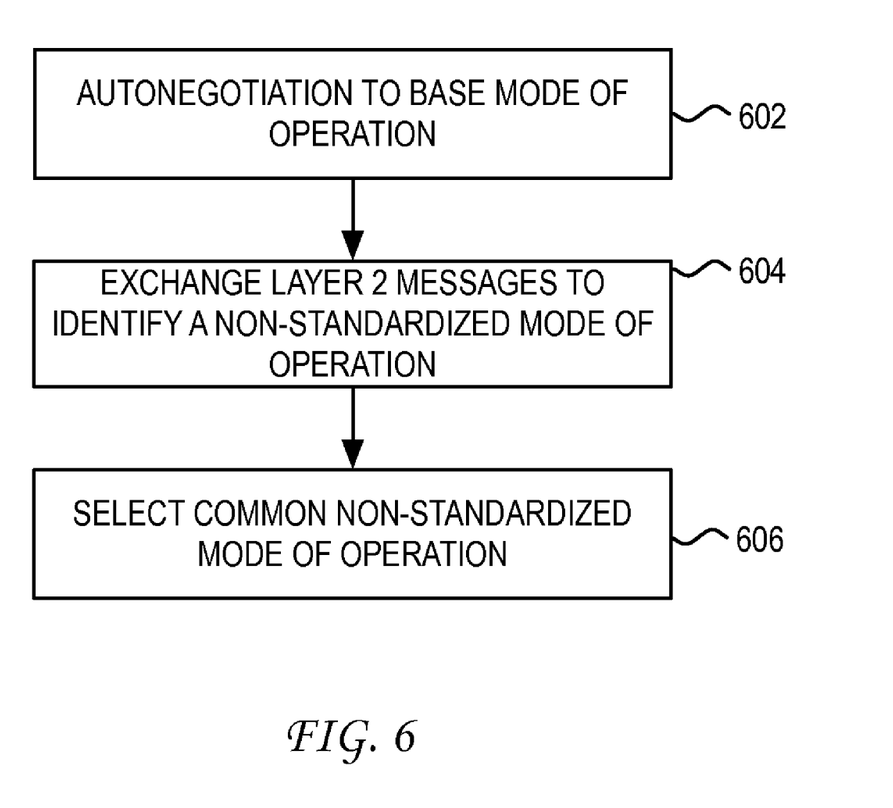
FIG. 6 illustrates a flowchart of an enhanced autonegotiation process using additional Layer 2 messages.

FIG. 6 illustrates further illustrates such a process. As illustrated, the process begins at step 602 where autonegotiation is used to select a base mode of operation. In one example, this base mode of operation can represent a minimum set of functionality for the Ethernet devices. This minimum set of functionality can be identified using a base autonegotiation message alone or in combination with additional autonegotiation messages. The particular base mode of operation would be implementation dependent, and is needed to establish a framework for further communication between the Ethernet devices.

Once the base mode of operation is established between the Ethernet devices, Layer 2 messaging can be exchanged at step 604. This Layer 2 messaging can be used to identify available non-standardized modes of operation that are supported by both Ethernet devices. As would be appreciated, Layer 2 messaging would not require standardized messaging formats such as those in the conventional autonegotiation process. Based on the messaging exchange, a common non-standardized mode of operation can then be selected at step 606 for use between the two Ethernet devices.

In general, the autonegotiation process can be implemented as a two-stage negotiation. The first stage of negotiation can be used to identify a base mode of operation. Establishment of this base mode of operation would facilitate the implementation of other enhancements as part of the second stage of negotiation. As would be appreciated, the particular types of enhancements would be implementation dependent and can relate to any characteristic of the mode of operation between the devices.

As has been described, the enhanced autonegotiation process of the present invention can be used to select from a mix of standardized and non-standardized modes of operation. In general, the principles of the present invention can also be used to autonegotiate to a variable rate. For example, each PHY can test the channel and exchange information regarding the channel (e.g., type of cable, length of cable, etc.) that can be used to select a variable rate (e.g., more than 1 G but less than 10 G depending on the type and length of cable).

It should be noted that the principles of the present invention can be applied to various PHY applications including twisted pair, backplane, optical, point-to-multipoint, etc. The principles of the present invention can also be applied to passive optical networks (PONs). Moreover, the principles of the present invention can be applied to various standard link rates (e.g., 10 Mbit/s, 100 Mbit/s, 1 Gbit/s, 10 Gbit/s, 40 Gbit/s), non-standard link rates (e.g., 2.5 Gbit/s, 5 Gbit/s, 20-30 Gbit/s, etc.), and future link rates (e.g., 100 Gbit/s and greater than 100 Gbit/s).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments.

Also, it is to be understood that the phraseology and terminology employed herein are for the purposes of description and should not be regarded as limiting.

What is claimed is:

1. A method of autonegotiating a common mode between an Ethernet device and partner Ethernet device, the method comprising:

retrieving management information that specifies a first set of one or more modes of operation of the Ethernet device;

modifying, using said retrieved management information, autonegotiation information that specifies a second of modes of operation of the Ethernet device to produce modified autonegotiation information, said second set representing actual modes of operation supported by the Ethernet device, wherein said modified autonegotiation information represents a remainder of said second set of modes of operation having said first set of modes of operation removed from said second set of modes of operation;

advertising said modified autonegotiation information to a partner Ethernet device; and identifying, based on autonegotiation received from said partner Ethernet device, a common operating mode with said partner Ethernet device.

2. The method of claim 1, wherein said retrieving management information comprises retrieving management information from a register.

3. The method of claim 1, wherein said retrieving management information comprises retrieving management information from a PROM.

4. The method of claim 1, wherein said retrieving management information comprises retrieving management information from a network database.

5. The method of claim 1, wherein said modified autonegotiation information represents a single mode of operation.

6. An autonegotiation method, comprising:

receiving, by a first Ethernet device from a second Ethernet device, one or more autonegotiation messages that indicate a capability of said second Ethernet device to support standardized modes of operation having standard link rates chosen from 10 Mbit/s, 100 Mbit/s and 1 Gbit/s;

transmitting, from said first Ethernet device to said second Ethernet device, one or more next page autonegotiation messages that indicate a capability of said first Ethernet device to support a non-standardized mode of operation that is chosen from one of a first mode having a link rate different from said standard link rates, a second mode having a maximum supported link distance that is different than 100 meters, and a third mode having an asymmetric configuration;

receiving, by said first Ethernet device from said second Ethernet device, one or more next page autonegotiation messages that indicate a capability of said second Ethernet device to support said non-standardized mode of operation; and selecting, by said first Ethernet device, said non-standardized mode of operation for use by said first Ethernet device.

7. The autonegotiation method of claim 6, wherein said receiving said one or more autonegotiation messages comprises receiving a base link code word.

8. The autonegotiation method of claim 6, wherein said transmitting comprises transmitting after transmitting messages that indicate 10 Mbit/s, 100 Mbit/s and 1 Gbit/s capabilities of said first Ethernet device.

9. The autonegotiation method of claim 6, wherein said selecting comprises selecting a short-reach mode of operation having a maximum supported link distance that is less than 100 meters.

10. The autonegotiation method of claim 6, wherein said selecting comprises selecting a long-reach mode of operation having a maximum supported link distance that is greater than 100 meters.

11. An autonegotiation method, comprising:
identifying, by a first Ethernet device, a base mode of operation using autonegotiation signaling with a second Ethernet device;
transitioning said first Ethernet device to said base mode of operation to facilitate communication between said first Ethernet device and said second Ethernet device;
transmitting, by said first Ethernet device to said second Ethernet device, additional messages that includes information that identifies support by said first Ethernet device of a second mode of operation different from said base mode of operation; and
upon a determination that said second Ethernet device also supports said second mode of operation, transitioning said first Ethernet device from said base mode of operation to said second mode of operation.

12. The method of claim 11, wherein said identifying comprises identifying a highest common denominator mode of operation.

13. The method of claim 11, wherein said second mode of operation has a link rate different from 10 Mbit/s, 100 Mbit/s, and 1 Gbit/s.

14. The method of claim 11, wherein said second mode of operation has a maximum supported link distance that is less than 100 meters.

15. The method of claim 11, wherein said second a mode of operation has a maximum supported link distance that is greater than 100 meters.

16. The method of claim 11, wherein said second mode of operation is an asymmetric mode of operation.

17. The method of claim 11, wherein said additional messages are Layer 2 messages.

* * * * *